United States Patent [19]

Fregeau

[11] 4,264,446
[45] Apr. 28, 1981

[54] STRAINER SCREEN

[76] Inventor: Jack J. Fregeau, Olympia Fields Country Club, Cottage 55, Olympia Fields, Ill. 60461

[21] Appl. No.: 64,081

[22] Filed: Aug. 6, 1979

[51] Int. Cl.³ .............................................. B01D 33/00
[52] U.S. Cl. ..................................... 210/356; 210/446
[58] Field of Search ............... 210/332, 356, 445, 446, 210/495, 499

[56] References Cited

U.S. PATENT DOCUMENTS

| | | | |
|---|---|---|---|
| 1,911,508 | 5/1933 | Hoff | 210/356 |
| 3,283,911 | 11/1966 | Reise | 210/446 X |
| 3,426,910 | 2/1969 | Winzen | 210/499 X |
| 3,966,439 | 6/1976 | Vennos | 210/356 X |
| 3,970,490 | 7/1976 | Raines et al. | 210/446 X |
| 4,169,059 | 9/1979 | Storms | 210/499 X |

Primary Examiner—Ivars C. Cintins
Attorney, Agent, or Firm—McDougall, Hersh & Scott

[57] ABSTRACT

A strainer screen and method for its production. The screen is utilized in systems for handling liquid wherein the liquids are moved through a conduit with the screen serving to collect solid material contained in the liquid to minimize passage of solid material in the conduit beyond the location of the screen. The screen consists of a surrounding frame with the periphery of the screen material attached to the frame. The screening material is confined between a pair of substantially co-extensive frame members. The screening material is welded to the frame members in a fashion such that very high operating forces can be encountered without damage to the screen. The welding operation is of a nature such that the frame members expand during the operation and then contract when cooled. This results in bowing of the screening material which provides a highly effective operating structure.

5 Claims, 5 Drawing Figures

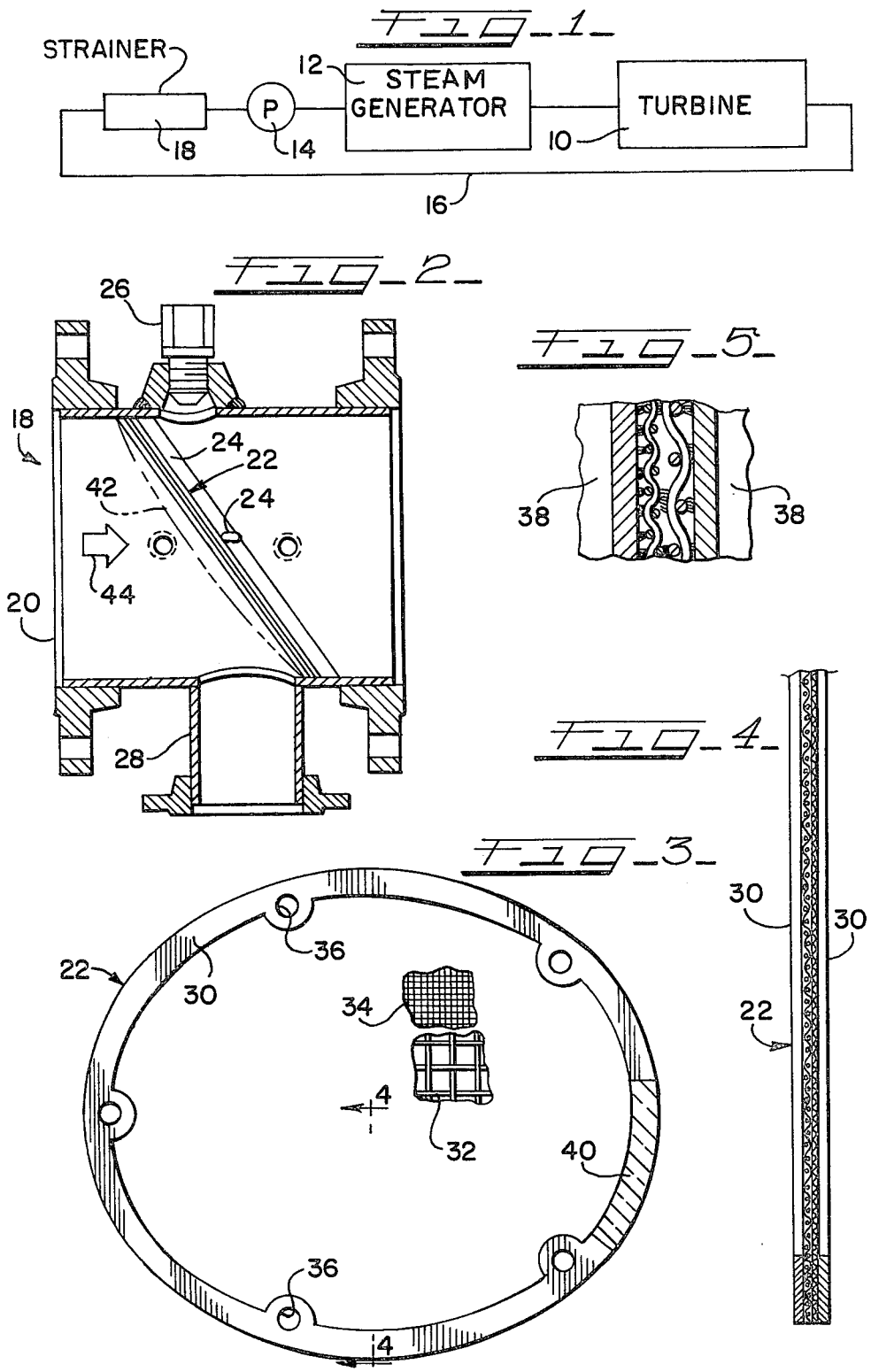

STRAINER SCREEN

BACKGROUND OF THE INVENTION

This invention relates to systems for handling liquids moving through conduits wherein solid materials are likely to be carried by the liquids. The invention is particularly directed to the provision of a strainer screen located in the conduit.

Steam turbine generator systems are typical of systems of the type referred to. In such operations, steam is produced and fed to a turbine, and the output of the turbine is pumped back to the steam generator with the steam produced again entering the turbine. Systems of this type comprise so-called "closed" systems, and it is desirable to minimize to the extent reasonably possible the presence of any solids in the liquid utilized in the system. For that reason, strainer screens are located in the conduits whereby the circulating liquid will continuously pass through the screen and whereby solid materials can be collected by the screen and removed from the system.

Means for cleaning the strainer screens to periodically separate solids completely from the system are often utilized. Such systems also may provide for removal of a strainer screen after a period of time since the proportion of solids in the system can gradually be reduced to a tolerable level particularly where the system is completely closed.

Prior strainer screens have included metal frames having screening material extending between the frame edges. Such systems have also included screening materials of different mesh located in overlying relationship. Typically, a prior art construction included a pair of U-shaped channels attached at their ends to form an enclosed frame. The layers of screening material would then be tack welded at a plurality of points to the frame. Stainless steel is typically utilized for both the frame and screening material in view of the corrosive conditions that can prevail in systems of the type referred to. This tack welding between the heavy section frame and the fine wire of the screen is unsatisfactory. The wire frequently is melted and broken in the weld area. This type of welds are always very weak and subject to failure.

Particularly where high performance systems are involved, for example in nuclear plants, very high operating pressures can be developed. It has been found that the forces generated can actually tear the screening material away from the surrounding frame. This provides a highly undesirable condition since a system may then operate for some time without the benefit of the strainer screen and thereby lead to damage or inefficient operation of the system.

It has also been found that strainer screens of prior art design are not effective from the standpoint of efficient removal of solids from a system. Specifically, the mechanisms employed for periodically cleaning a screen to remove solids are often ineffective whereby solids remain in the screen even after a cleaning operation. This reduces the flow efficiency in the system.

SUMMARY OF THE INVENTION

In accordance with this invention, strainer screens of high performance capabilities are produced. These strainer screens comprise surrounding frames consisting of a pair of substantially co-extensive frame members. Screening material is provided with the peripheral edges of the material being located between the respective frame members. A welding operation is then conducted to secure each of the frame members to the screening material.

The welding operation is of a nature such that the respective frame members are heated to very high temperatures whereby expansion of the frame members occurs. The periphery of the screening material is secured to the framing members during the welding operation, and when the framing materials contact upon cooling, the screening material is caused to bow outwardly relative to a plane extending between the frame members.

The bowed condition of the screening material has a pronounced effect on the operating efficiency of the screen. Specifically, the bowed screen is characterized by flexibility in the course of system operation whereby trapped solid particles become easily removable from the screening material during a cleaning operation. A "pulse" effect is encountered when the system is changed over to the cleaning operation whereby solid particles are caused to be more readily released from the screen face.

The welding technique employed has also been found to provide a screen of substantially greater strength. In particular, the screening material is preferably welded all about its periphery to both frame members whereby the possibility of the screening material tearing away from the frame members is virtually eliminated. The strength characteristics are particularly apparent where the screening material consists of two layers of different mesh. In that case, the wires of the respective screens are welded to each other at numerous locations around the periphery in addition to being welded to the respective frame members. Accordingly, a very high strength assembly is accomplished.

BRIEF DESCRIPTION OF THE DRAWINGS

FIG. 1 is a schematic view of a system of the type including a strainer screen of the type contemplated by this invention;

FIG. 2 is a cross-sectional view of a strainer having a screen mounted therein and having associated screen cleaning mechanisms;

FIG. 3 is a plan view of a strainer screen of the type contemplated by this invention;

FIG. 4 is a fragmentary, cross-sectional view of the strainer screen; and,

FIG. 5 is an enlarged fragmentary, cross-sectional view illustrating the welded condition of a strainer screen.

DESCRIPTION OF THE PREFERRED EMBODIMENTS

FIG. 1 illustrates a system including a steam turbine 10 which may be employed for generating electricity. A steam generator 12 is located up-stream of the turbine, and pump 14 is employed for delivering liquid to the steam generator. The system illustrated comprises a closed system whereby the conduit 16 serves to return the output of the turbine 10 to the pump 14 for reintroduction into the generator 12.

The output of the turbine has returned to the liquid state by the time it reaches pump 14. In accordance with typical practice, a strainer 18 is positioned up-stream of the pump for purposes of removing solids from the liquid before the liquid is pumped into the steam generator.

FIG. 2 illustrates a strainer construction. This includes a housing 20 having entry and exit ends communicating with the main stream conduit. A strainer screen 22 is mounted within the housing and disposed at an angle relative to the axis of the housing. The screen is disposed in this fashion to facilitate cleaning, and since the housing 20 is generally of circular cross section, the screen 22 is generally elliptical whereby the outer edges of the screen extend adjacent the interior wall of the housing.

A plurality of screen back-up bars 24 are fixed within the housing. These bars extend between the inner wall of the housing and are rigidly fixed to the housing down-stream of the screen location. The bars provide a support for the screen thereby tending to prevent the flow of liquid from pushing the screen away from the frame. It will be appreciated, however, that the bars must be spaced apart by a significant degree in order to avoid disruption of liquid flow. Accordingly, they cannot serve to completely back-up the screen.

The strainer 18 also includes a spray nozzle 26 which is directed downwardly toward the screen. A drain 28 is located at the bottom of the housing, and this arrangement permits the directing of a high pressure stream against the screen for cleaning purposes. Specifically, the liquid flow through the housing can be periodically interrupted at which time the spray nozzle is operated for purposes of dislodging particles collected on the screen. The particles as well as the cleaning fluid are then removed through the drain 28.

FIGS. 3 and 4 illustrate the screen construction of this invention. This construction includes first and second frame members 30. Screening material is located between the respective frame members. In accordance with preferred practice, the screening material comprises a first sheet 32 which will typically be a 2×2 stainless steel woven mesh of 0.08 inch diameter wire. A second sheet 34 of screening material is located in overlying relationship relative to the sheet 32. This sheet comprises a finer mesh, typically 8×8 stainless steel woven mesh of a 0.031 inch diameter wire.

The frame members define a plurality of bolt holes 36 which are employed for holding the screen in place in a strainer. Thus, the assembly comprising bars 24 may include a peripheral frame having corresponding holes for receiving attaching bolts. Each frame member is preferably integral.

In accordance with this invention, the assembly of the frame members and screening material is achieved by means of a resistance welding operation. The welding operation itself is standard in that opposed electrodes 38 are adapted to engage the opposed frame members as shown in FIG. 5. In a contemplated form of the invention, the electrodes will have a configuration approximating that shown in the area 40 illustrated in FIG. 3. A plurality of welds will be formed by means of these electrodes around the periphery of the screen. In accordance with the preferred practice, the welded areas will be substantially side-by-side so that the frame will be welded to the screening material substantially completely around the screen.

The welding technique is also standard from the standpoint that high pressure is applied to the electrodes while the welding current is applied. This achieves a good weld and particularly insures the complete welding of the respective frame elements whereby the high strength characteristics of the invention can be achieved. In a typical operation involving a screen having a long dimension of 12 inches, and a welded area $\frac{1}{2}$ inch by 4 inches, 100 KVA is applied under a force of 1500 pounds. It will be appreciated that these figures may vary particularly as the size of the screens vary.

FIG. 5 illustrates the welded condition achieved in accordance with this invention. Specifically, it will be noted that the wire projections which characterize the screen are welded to an adjacent frame surface. Similarly, wire projections of the adjacent screens are welded to each other. This condition accomplishes the strength characteristics which are achieved and which provide a pronounced improvement relative to screens produced utilizing prior art techniques.

It will be understood that the illustration of FIG. 5 has been expanded in order to simplify the explanation. In practice, the pressures and welding temperatures provide a highly compact relationship of the frame members and wire mesh which achieves the high strength characteristics of the invention.

The welding process preferably comprises a process known as "resistance projection". This employs a press-type welding machine capable of applying the desired pressure and a controlled welding current.

In view of the welding conditions as well as the characteristics of the screening material and frame members, metal fusion occurs resulting in a coalesced layer. Specifically, metal fusion or coalescence occurs in any location where there is physical contact between a wire and frame surface or between one wire and another wire. The fusion which occurs is schematically illustrated in FIG. 5.

The welding cycle employed involves squeezing of the frame and screening material between the electrodes, the application of welding current, a holding period, and then a release of the pressure and termination of the current application. This provides a "parent metal quality" for the welds.

An added benefit of the procedure of the invention and the structural arrangement employed is that the frame sections are heated to very high temperatures during the welding process. This results in a significant amount of expansion, and the expansion occurs around the entire periphery of the frame. In contrast, the portion of the screening material within the frame is not heated to a significant degree and, therefore, this screening material does not expand. When the frame cools, there is a contraction; however, at that stage, the screening material is securely fixed to the frame. The result is that a uniform "pillowing" or "bowing" effect develops. This provides an important aspect of the invention from the standpoint of the system incorporating the improved screen.

Specifically, the screening material is bowed outwardly as shown at 42 in FIG. 2 when the screen is located in position for encountering liquid. The direction of liquid flow and, therefore, the direction of pressure against the screen is illustrated by arrow 44. It will be appreciated that this tends to force the screen inwardly. This characteristic is particularly true of the finer mesh, lighter screen which is normally on the up-stream side.

Foreign particles impinge on the screen during operation of the system, and these particles build-up until a cleaning cycle is initiated. As illustrated in FIG. 2, the cleaning cycle involves a shut-down of the liquid flow through the strainer 18 followed by the passage of fluid under high pressure through nozzle 26. This results in pressure on the screen in the opposite direction whereby the screen is bowed outwardly. It has been found that this action dislodges particles from the screen in a highly effective manner. Accordingly, the screen can be more completely cleaned whereby a more efficient liquid flow can be achieved.

The dislodging of foreign particles can also be accomplished by simply the turbulence of flow of the liquid through the strainer. Thus, the screen vibration produced by the above turbulence will result in continuous "popping" of the screen outwardly and upwardly to dislodge particles whether or not fluid pressure is applied from nozzle 26.

When mounted in a strainer, the screen of the invention has also been found to achieve a highly stable condition. Specifically, the heavier mesh screening material is normally located on the upstream side and, therefore, that screening material engages the bars 26. When bolted in place, the bars tend to flatten the screening material thereby creating a "lock washer" effect and thereby developing a highly stable condition of bolt tightness.

It will be appreciated that the welding operations referred to generally involve prior art techniques and that the configuration of the electrodes utilized may vary for practical reasons. Similarly, the reference to separate frame members concerns the preferred embodiment of the invention and that the invention could be practiced utilizing frame members of various designs including those of U-shaped cross section as long as provision is made for engagement of frame members by electrodes on opposite sides of screening material positioned intermediate to the frame members.

It will be understood that various changes and modifications may be made in the system described which provide the characteristics of this invention without departing from the spirit thereof particularly as defined in the following claims.

I claim:

1. In a system for handling liquids wherein the liquids are moved through a conduit, and wherein a screen comprising screening material and an associated frame is mounted in the conduit for contact with the liquid to thereby collect solid material contained in the liquid, the improvement wherein said frame comprises a pair of substantially co-extensive frame members, said screening material having its peripheral edges located between the respective frame members, and welds attaching the frame members directly to the screening material, said screening material being normally bowed outwardly relative to a plane extending parallel with said frame members, said screening material being positioned such that the movement of liquids forces the screening material inwardly towards said plane.

2. A system in accordance with claim 1 wherein said screening material consists of a heavier mesh and a lighter mesh screen in overlying relationship.

3. A system in accordance with claim 2 wherein said welds consist of welds formed between the inner surfaces of each frame member and the wires of each of the screening materials, and also welds between wires of the respective screening material.

4. A system in accordance with claim 3 wherein said welds extend substantially completely around the periphery of said screen.

5. A system in accordance with claim 4 wherein said frame members initially consist of two separate elliptical pieces of metal.

* * * * *